F. E. McEWEN.
PROCESS OF RETREADING TIRES.
APPLICATION FILED DEC. 9, 1918.
1,306,602.
Patented June 10, 1919.
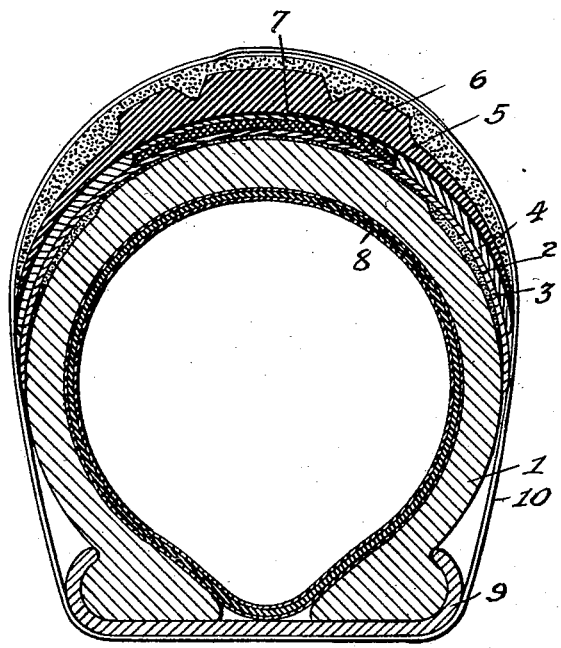

UNITED STATES PATENT OFFICE.

FRED E. McEWEN, OF CHICAGO, ILLINOIS, ASSIGNOR TO SOLOMON H. GOLDBERG, OF CHICAGO, ILLINOIS.

PROCESS OF RETREADING TIRES.

1,306,602.	Specification of Letters Patent.	Patented June 10, 1919.

Application filed December 9, 1918. Serial No. 265,839.

*To all whom it may concern:*

Be it known that I, FRED E. McEWEN, a citizen of the United States, residing in the city of Chicago, county of Cook, and State of Illinois, have invented certain new and useful Improvements in Processes of Retreading Tires, of which the following is a specification.

This invention relates to improvements in retreading tires and has among its salient objects to provide a process in which the tread is securely fixed to the body of the tire or vulcanized thereto by and in such a way that the tread will not become loosened from the tire, due largely to the use of an improved and novel form of adhesive solution; to provide a process of the character referred to in which the tread of the tire during the process of retreading and vulcanization is coated with a chemically treated matrix, so as to insure not only a uniform vulcanization of the tread, particularly in the case of treads of the non-skid type, but also to prevent any local overheating of the tread during vulcanization; to provide a process in which the tire, during the step of vulcanization, is subjected to a constantly increasing uniform pressure on both the inner and outer periphery of the tire; to provide a process of the character last referred to in which this pressure is obtained through the means of an inflated inner tube, the pressure of which increases with the heat of vulcanization; to provide a process in which the opposed surfaces of the tire, rubber gum strips and tread are subjected to the treatment of a novel and improved chemical solution; to provide a process in which the inner tube above referred to is provided with a chemically treated casing to prevent the inner tube vulcanizing to the tire body; to provide a process in which the retreading can be carried out as one continuous operation; to provide a method of retreading tires which is not only economical and simple of operation but where the product produced has a tread that is securely and firmly fixed to the body of the tire and in such a way as to prevent any working loose or displacement of the tread and in general to provide an improved process and product of the character referred to.

The single figure of the drawings is a vertical sectional view of a tire treated in accordance with my improved process and ready to be put into the oven for vulcanizing.

As is well known to those skilled in the art, the treads of tires wear out before the body and as a result a considerable industry has grown up in the retreading of old tires. The various methods that have been utilized for retreading tires have been unsatisfactory, great difficulty being experienced in each of the methods in so securely fixing or fastening the tread to the old tire body as to prevent the tread working loose or becoming laterally displaced. Another difficulty has been experienced in the present method of retreading old tires, which is that in these treads the rubber hardens or loses its resiliency and thus materially affects the efficiency of the tire. Another objection to the methods now in use is that the chemical solution is not efficient and vulcanization does not properly take place. Difficulty has also been experienced in preventing local overheating of the tread of the tire during vulcanization and obtaining a local uniform cure. The foregoing objections are not found in the present invention.

Describing now the method of carrying out my improved process, the old tread is removed from the tire 1 and the outer surface scraped and cleaned, and is preferably buffed with an emery wheel. The smooth outer surface of the tire is then painted with a chemical solution. If the tire is in good condition one coat of the solution may be sufficient, but if the surface is more or less worn or broken two or more coats may be necessary. The character of this solution forms an important feature of the present invention. The solution preferably consists of the following ingredients: 90 per cent. benzol (a coal tar product) of ninety per cent. strength, 7 per cent. petroleum naphtha, of seventy-eight Baumé gravity, and 3 per cent. denatured alcohol. This is mixed with para rubber gum which is dried with sufficient sulfur to permit of vulcanization and the gum mixed with the above liquids to sufficient thinness. It is to be understood that the foregoing proportions may be varied as the character of the ingredients may vary or the experience of the operator may dictate.

After this solution has been applied to the tire body 1, a strip of pure gum rubber 3 is placed around the tread of the tire and a second strip 4 is also placed around the tire, and between these two strips is interposed a breaker strip 5. This breaker strip 5 preferably does not extend as far over the sides of the tire as do the gum strips referred to, as is shown in drawings. This breaker strip is an adhesive rubber fabric and includes the two gum strips 3 and 4. Around the outer gum strip 4 is placed the tread 6 which in the present instance is shown as of the non-skid type. The inner side of this tread 6 is painted with a solution 7 which may be same solution as was painted around the outer periphery of the tire body. After the tread has been applied, the parts are pressed together to form a temporary bond and the parts evened out. Preferably after the tire has been painted with the solution referred to, an inner pneumatic tube 7, hereinafter described, is placed in the tire casing and the rim is also put on. The tire is preferably partially inflated, the idea being not to have too great a pressure on the inner tube at this time. The inner tube 7 is preferably, that which is known as the Palmer tube consisting of a fabric interposed between two rubber sheets united together. In order to prevent the inner tube from vulcanizing to the casing the latter is painted with a chemical solution, which may consist of the following: 50 per cent. whiting, 35 per cent. powdered soap stone, and 10 per cent. petroleum naphtha, to the above mixture is added 5 per cent. of the chemical solution previously referred to. The purpose of this solution is as above stated. Before the tread is applied to the tire a muslin or other fabric strip may be placed over the outer gum strip 4 while the tread is being applied so as to insure the tread setting more uniformly in place without adhesion. After the tread is in place, the muslin strips are pulled out.

As an important feature of the invention, after the new tread is applied to the old tire, as stated, the outer face of the tire is covered with a chemically treated matrix, which may be made of 3 per cent. strength of solution of sulfur bichlorid, which is mixed with asbestos fiber to make a putty. This matrix incases the tread and protects the outer surface thereof from local overheating, and also insures of uniform curing as heretofore stated. After the matrix is applied the entire tire and rim are wrapped with a fabric 10 which is drawn tightly around the tire and rim. The inner tube is originally inflated only to say 10 to 15 pounds, but after the covering 10 is applied the inner tube is inflated to a greater extent, of probably 35 pounds.

The tire is then placed in a vulcanizing oven and subjected to the action of hot dry air. In the vulcanizing oven is placed a vessel containing a liquid solution of sulfur and bichlorid which is evaporated by the heat and asbestos in vulcanizing. The heating of the tire in the oven of course inflates the air in the inner tube preferably to about 75 pounds. If for any reason the inner tube leaks or the pressure does not remain right, the inner tube must be pumped up to the desired pressure. While in the oven the tire is preferably rotated on a suitable support so as to give a more uniform exposure to the hot air. It is important that the tire be not overheated in the oven. I have found in certain cases 265° F. is the desirable heat to use. In some cases a variation of a few degrees may prevent proper vulcanization. The length of time necessary for vulcanization varies to some extent with the size of the tire, about two and half hours for the smaller tires and three hours for the larger ones is generally sufficient.

After the tire has been vulcanized, it is removed from the oven and allowed to cool in the air. The outer sheathing 10 is then upwrapped from the tire and the matrix removed. The inner tube is then deflated and the rim and inner tube removed. The tire can then be cleaned if necessary and is now ready for use.

I claim as my invention:

1. The described process comprising removing the tread portions from the carcass and smoothing the periphery of the carcass, then applying to the peripheral surface of the carcass one or more coats of a rubber solution containing a curing ingredient, then applying to said surface a strip of material formed of pure gum stock having a fabric breaker strip embedded therein throughout the middle portion of the same, then applying the main tread strip formed of tread stock with a coating of rubber solution containing a vulcanizing ingredient between the opposing surfaces of the main tread strip and said pure gum strip, suitably binding the parts together for holding them in the desired form during vulcanization and then curing the built-up article on an air bag in a dry air heater containing a vulcanizing agent in solution.

2. The described process comprising removing the tread portions from the carcass and smoothing the periphery of the carcass, then applying to the peripheral surface of the carcass one or more coats of a rubber solution containing a curing ingredient, then applying to said surface a strip of material formed of pure gum stock having a fabric breaker strip embedded therein throughout the middle portion of the same, then applying the main tread strip formed of tread stock with a coating of rubber solution containing a vulcanizing ingredient between the opposing surfaces of the main tread strip and said pure gum strip, suitably binding the parts together for holding them in the desired form during vulcanization and then curing the built-up article on an air bag in a dry air heater containing a liquid solution of bichlorid of sulfur.

3. The described process of applying a tread section to a tire carcass comprising suitably smoothing the peripheral surface of the carcass, applying thereto one or more coats of a rubber solution containing a vulcanizing ingredient, then applying to said surface of the carcass a strip of pure gum stock, superimposing upon said strip a second strip of pure gum stock with an intermediate strip of friction fabric of less width than the strips of pure gum stock, then applying the main tread strip formed of a suitable tread stock having its inner surface coated with a rubber solution containing a vulcanizing ingredient, placing an air bag within the carcass, applying the carcass to a rim, suitably inflating the air bag, applying to the outer surface of the main tread strip a matrix comprising asbestos fiber and a curing ingredient, wrapping a fabric strip about the article so built up for holding the parts to the desired form during vulcanization and then subjecting the article to a vulcanizing treatment.

4. The described process of applying a tread section to a tire carcass comprising suitably smoothing the peripheral surface of the carcass, applying thereto one or more coats of a rubber solution containing a vulcanizing ingredient, then applying to said surface of the carcass a strip of pure gum stock, superimposing upon said strip a second strip of pure gum stock with an intermediate strip of friction fabric of less width than the strips of pure gum stock, then applying the main tread strip formed of a suitable tread stock having its inner surface coated with a rubber solution containing a vulcanizing ingredient, placing an air bag within the carcass, applying the carcass to a rim, suitably inflating the air bag, applying to the outer surface of the main tread strip a matrix comprising asbestos fiber and a curing ingredient, wrapping a fabric strip about the article so built up for holding the parts to the desired form during vulcanization and then curing the article in a dry air heater containing a vulcanizing agent in solution.

FRED E. McEWEN.